(12) United States Patent
Oh et al.

(10) Patent No.: US 9,817,275 B2
(45) Date of Patent: Nov. 14, 2017

(54) DISPLAY DEVICE AND MANUFACTURING METHOD THEREOF

(71) Applicant: Samsung Display Co. Ltd., Yongin-si, Gyeonggi-do (KR)

(72) Inventors: Seung Hee Oh, Goyang-si (KR); Joon Hyeong Kim, Cheonan-si (KR); Sung Hwan Bae, Asan-si (KR); Seung Ki Song, Suwon-si (KR); Chung Hyuk Lee, Yongin-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 8 days.

(21) Appl. No.: 15/149,694

(22) Filed: May 9, 2016

(65) Prior Publication Data

US 2017/0123244 A1 May 4, 2017

(30) Foreign Application Priority Data

Nov. 2, 2015 (KR) ........................ 10-2015-0153027

(51) Int. Cl.
*G02F 1/1337* (2006.01)
*G02F 1/1339* (2006.01)
(Continued)

(52) U.S. Cl.
CPC .......... *G02F 1/1339* (2013.01); *G02F 1/1337* (2013.01); *G02F 1/13439* (2013.01);
(Continued)

(58) Field of Classification Search
CPC .. G02F 1/136; G02F 1/1335; G02F 1/133514; G02F 1/1339; G02F 1/133516; G02F 1/1337; G02F 1/1333; G02F 1/133345; G02F 1/13454; G02F 1/1368; G02F 1/1362; G02F 1/13624; G02F 1/133711; G02F 1/136286; G02F 2001/133388; G02F 2001/136222; G02F 2001/133354; G02F 2001/133302; G02F 2001/133357; G02F 2201/50; H01L 27/322; H01L 27/14621; H01L 27/3246; H01L 27/3276; H01L 27/3211;
(Continued)

(56) References Cited

U.S. PATENT DOCUMENTS

| 8,287,209 B2 | 10/2012 | Feldman et al. |
| 8,999,487 B2 | 4/2015 | Berg et al. |
| 2014/0132901 A1* | 5/2014 | Kim .................. G02F 1/133753 349/129 |

FOREIGN PATENT DOCUMENTS

| KR | 10-130034 B1 | 8/2013 |
| KR | 1020140062669 A | 5/2014 |

* cited by examiner

*Primary Examiner* — Thoi Duong
(74) *Attorney, Agent, or Firm* — Cantor Colburn LLP

(57) ABSTRACT

A display device includes: a first substrate on which a display area and a non-display area which is outside the display area are defined; and a dam pattern disposed on at least one side of the display area and in the non-display area. The dam pattern includes a first dam pattern defining a first stem portion thereof which lengthwise extends in a first direction, and a first branch portion which extends from the first stem portion, and a second dam pattern defining a second stem portion thereof which lengthwise extends in the first direction, and a second branch portion which extends from the second stem portion and is spaced from and faces the first branch portion.

20 Claims, 17 Drawing Sheets

(51) Int. Cl.
  *G02F 1/1333* (2006.01)
  *G02F 1/1335* (2006.01)
  *G02F 1/1343* (2006.01)
(52) U.S. Cl.
  CPC .. *G02F 1/133345* (2013.01); *G02F 1/133512* (2013.01); *G02F 1/133514* (2013.01); *G02F 1/133723* (2013.01); *G02F 2001/133388* (2013.01)
(58) Field of Classification Search
  CPC ............. H01L 51/525; H01L 29/41733; H01L 29/4908; G09G 2360/18
  USPC ......... 349/106, 156, 155, 153, 123, 42, 122, 349/158, 190, 43, 138
  See application file for complete search history.

DISPLAY DEVICE AND MANUFACTURING METHOD THEREOF

This application claims priority to Korean Patent Application No. 10-2015-0153027 filed on Nov. 2, 2015, and all the benefits accruing therefrom under 35 U.S.C. §119, the content of which in its entirety is herein incorporated by reference.

BACKGROUND

1. Field

The invention relates to a display device and a manufacturing method thereof.

2. Description of the Related Art

The importance of display devices has steadily grown with developments in multimedia technology. As a result, a variety of display devices such as a liquid crystal display ("LCD"), an organic light-emitting diode ("OLED") display, and the like have been developed and widespread.

A liquid crystal display ("LCD"), which is one of the most widely-used flat panel displays, includes two substrates on which field-generating electrodes such as pixel electrodes and a common electrode are formed, and a liquid crystal layer which is interposed between the two substrates. The LCD generates an electric field in the liquid crystal layer by applying a voltage to the field-generating electrodes, and thus displays an image by determining the orientation of liquid crystal molecules in the liquid crystal layer and controlling the polarization of incident light therethrough.

The LCD includes a display area in which an image is displayed and a non-display area in which an image is not displayed and various signal lines are provided for displaying the image in the display area. A size of the non-display area is increasingly reduced for the realization of an LCD with a relatively narrow bezel. However, the limited size of the non-display area leads to various issues concerning how to arrange wiring and how to handle interference from the display area.

SUMMARY

Exemplary embodiments of the invention provide a display device having a narrow bezel.

Exemplary embodiments of the invention also provide a display device having excellent bonding properties between upper and lower substrates thereof.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a display device includes: a first substrate on which a display area and a non-display area which is outside the display area are defined; and a dam pattern disposed on at least one side of the display are and in the non-display area, the dam pattern including a first dam pattern defining a first stem portion thereof which lengthwise extends in a first direction, and a first branch portion which extends from the first stem portion, and a second dam pattern defining a second stem portion thereof which lengthwise extends in the first direction, and a second branch portion which extends from the second stem portion, the second branch portion being spaced from and facing the first branch portion.

The first branch portion and the second branch portion may lengthwise extend in a second direction, which is perpendicular to the first direction.

The first branch portion and the second branch portion may be arranged in a staggered manner.

The first branch portion and an inner side of the first stem portion may form a first angle, the second branch portion and an inner side of the second stem portion may form a second angle, and at least one of the first angle and the second angle may be an acute angle.

The display device may also include an alignment layer disposed on the first substrate and partially overlapping the dam pattern.

The alignment layer may overlap the first stem portion and the first branch portion of the first dam pattern.

The spaced apart first branch portion and second branch portion may define a gap therebetween, and the alignment layer may overlap the gap.

The display device may also include a seal pattern which is disposed in the non-display area and combines the first substrate with a second substrate facing the first substrate.

The seal pattern may partially overlap the dam pattern.

The seal pattern may completely overlap the second stem portion and the second branch portion of the second dam pattern in the top plan view.

The display device may also include an alignment layer disposed on the first substrate and partially overlapping the dam pattern. A bottom surface of the seal pattern may contact the alignment layer disposed partially overlapping the dam pattern.

An area of contact between the bottom surface of the seal pattern and the alignment layer may be smaller than half a total area of the bottom surface of the seal pattern.

The seal pattern may be disposed non-overlapping the dam pattern.

Sides of the display area may define a circumference of the display area. The dam pattern may be provided in plural to be respectively disposed at each side of the display area to surround the circumference of the display area.

For the dam patterns respectively disposed at each side of the display area, the first and second dam patterns may each be respectively disposed at adjacent sides of the display area to respectively define first and second stem portions lengthwise extended parallel to the adjacent sides of the display area, the first and second dam patterns may respectively further define first and second inclined portions thereof which respectively connect the first and second stem portions thereof parallel to the adjacent sides of the display area, to each other, and the first and second inclined portions may each extend in a direction inclined from the first direction at corner portions of the display area.

Four sides of the display area may define a rectangular circumference thereof, and the dam pattern may be disposed adjacent to at least one of the four sides which define the circumference of the display area.

According to another exemplary embodiment of the invention, a manufacturing method of a display device includes: preparing a first substrate on which a display area and a non-display area which is outside the display area are defined; and forming a dam pattern in the non-display area, the dam pattern including a first dam pattern defining a first stem portion thereof which lengthwise extends in a first direction, and a first branch portion which extends from the first stem portion, and a second dam pattern defining a second stem portion thereof which lengthwise extends in the first direction, and a second branch portion which extends from the second stem portion and is spaced from and faces the first branch portion.

The manufacturing method may also include forming a first alignment layer in the display area, the alignment layer extended to partially overlap the dam patterns.

The manufacturing method may also include forming a seal pattern on the first substrate and partially overlapping the dam pattern.

The seal pattern may completely cover the second stem portion and the second branch portion of the second dam pattern in a top plan view.

According to the exemplary embodiments, a display device having a narrow bezel may be provided by reducing the size of a non-display area.

In addition, deterioration of the adhesive performance of a seal pattern in the non-display area due to a spread of a display area alignment layer to a seal area may be reduced or effectively prevented.

Other features and exemplary embodiments will be apparent from the following detailed description, the drawings, and the claims.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
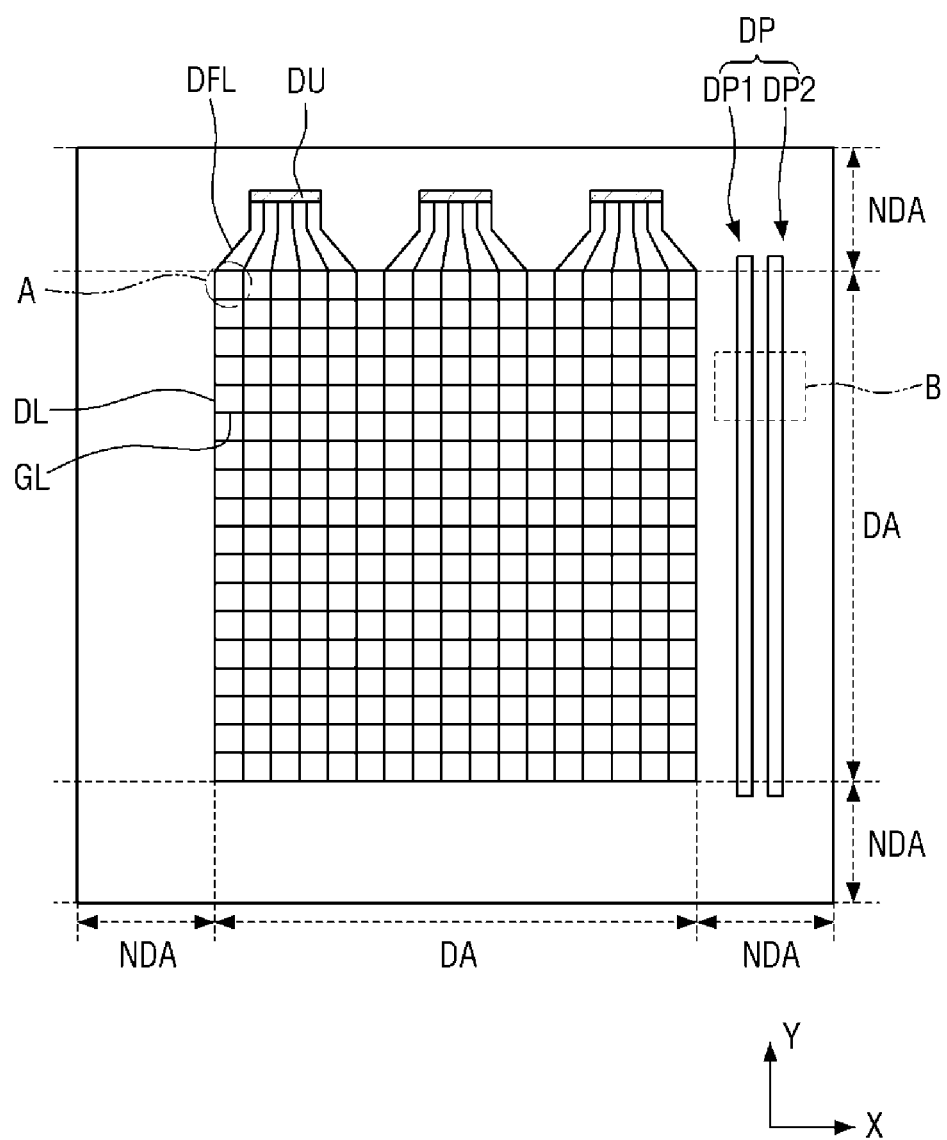
FIG. 1 is a top plan view of an exemplary embodiment of a display device according to the invention.

Display devices according to exemplary embodiments of the invention will hereinafter be described, taking a liquid crystal display ("LCD") as an example, but the invention is not limited thereto. That is, the type of the display devices according to exemplary embodiments of the invention is not particularly limited, and the invention is applicable to various types of display devices. In exemplary embodiments, for example, some or all features of the display device according to exemplary embodiments of the invention may apply to an organic light-emitting diode ("OLED") display.

The features of the invention and methods for achieving the features will be apparent by referring to the exemplary embodiments to be described in detail with reference to the accompanying drawings. However, the invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the invention is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
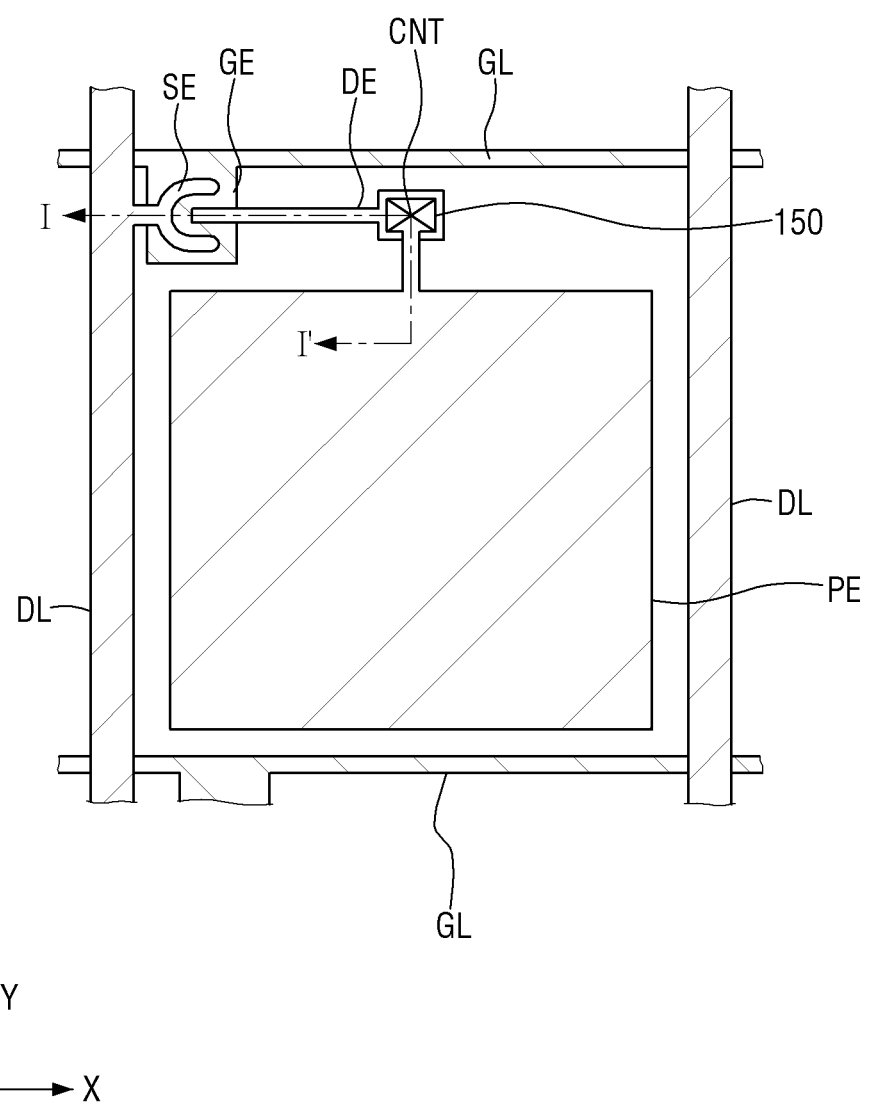
FIG. 2 is an enlarged top plan view of an exemplary embodiment of an area A of FIG. 1.
Figure 3:
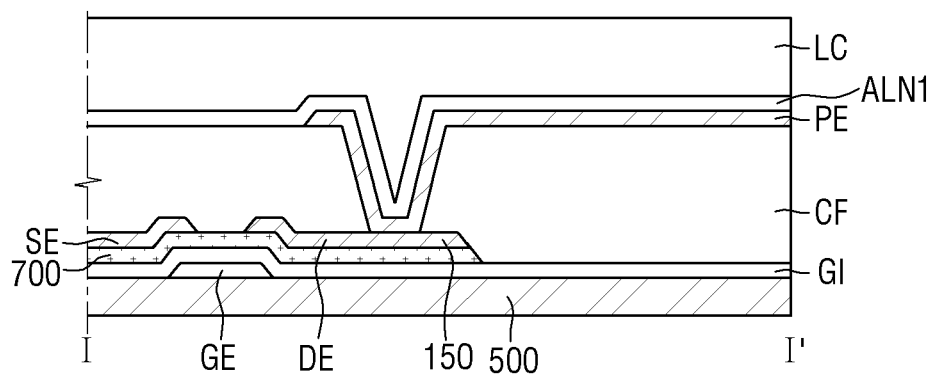
FIG. 3 is a cross-sectional view taken along line I-I' of FIG. 2.
Figure 4:
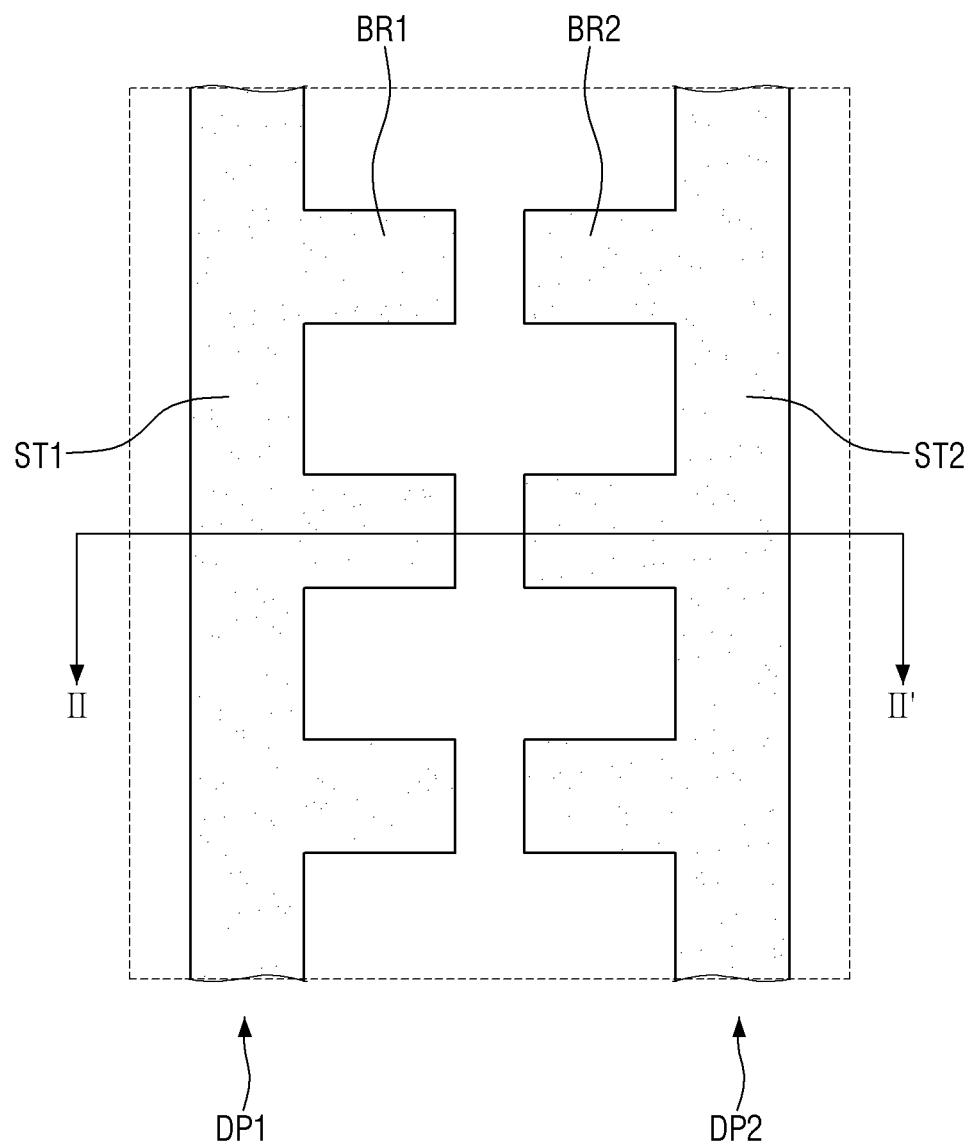
FIG. 4 is an enlarged top plan view of an exemplary embodiment of an area B of FIG. 1.
Figure 5:
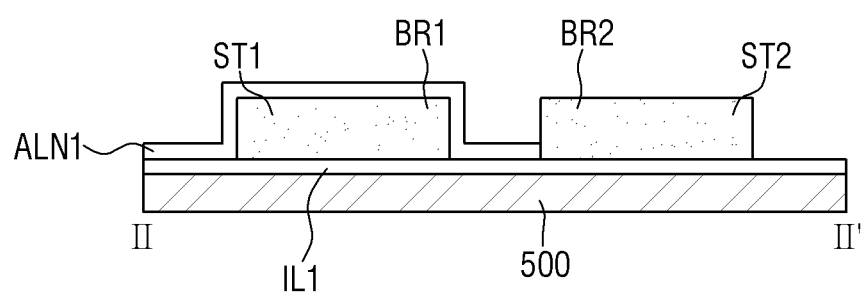
FIG. 5 is a cross-sectional view taken along line II-II' of FIG. 4.

FIG. 1 is a top plan view of an exemplary embodiment of a display device according to the invention. FIG. 2 is an enlarged top plan view of an exemplary embodiment of an area A of FIG. 1. FIG. 3 is a cross-sectional view taken along line I-I' of FIG. 2. FIG. 4 is an enlarged top plan view of an exemplary embodiment of an area B of FIG. 1. FIG. 5 is a cross-sectional view taken along line II-II' of FIG. 4.

Referring to FIGS. 1 to 5, the exemplary embodiment of the display device according to the invention includes a first substrate 500, which includes a display area DA and a non-display area NDA, and dam patterns DP, which include a first dam pattern DP1 and a second dam pattern DP2. The first and second dam patterns DP1 and DP2 may be discrete members disposed at a side of the display area, but the invention is not limited thereto. The first dam pattern DP1 is disposed on at least one side of the non-display area NDA and includes a first stem portion ST1, which extends lengthwise in a second direction, and at least one first branch portion BR1 which is branched off and extends from the first stem portion ST1. The second dam pattern DP2 is disposed lengthwise in parallel to the first dam pattern DP1 and includes a second stem portion ST2, which lengthwise extends in the second direction, and at least one second branch portion BR2 which is branched off and extends from the second stem portion ST2 and is spaced from and faces the first branch portion BR1.

The first substrate 500 may include or be formed of a heat-resistant and transmissive material. The first substrate 500 may include or be formed of, for example, transparent glass or plastic, but the invention is not limited thereto. The display area DA and the non-display area NDA are defined on the first substrate 500.

In the exemplary embodiment, the display area DA is an area in which an image is displayed by the display device, and the non-display area NDA is an area in which various signal lines are provided for driving elements in the display area DA to display the image in the display area DA.

A data driver DU which provides a data signal to one or more of a data line DL, and one or more of a fan-out line DFL which transmits a signal provided by the data driver DU to the data line DL, may be disposed in the non-display area NDA. The data driver DU, the data line DL and the fan out line DFL may be provided in plural at respective areas of the display device.

The display area DA will hereinafter be described. A pixel is provided in plural on the first substrate 500. In an exemplary embodiment, the pixel may be defined by intersection of the data line DL and a gate line GL, but the invention is not limited thereto. The gate line GL and the data line DL may be provided in plural within the display area DA.

FIG. 2 illustrates an enlarged top plan view of an exemplary embodiment of the pixel (particularly, the area A of FIG. 1), and the display area DA may include a plurality of pixels that are substantially identical to the pixel illustrated in FIG. 2.

Gate wiring (GL and GE) may be disposed on the first substrate 500. The gate wiring (GL and GE) may include the gate line GL, which receives a signal for driving, and a gate electrode GE which protrudes from the gate line GL in the form of a projection. The gate line GL may lengthwise extend in a first direction. The first direction may be substantially the same as, for example, an X-axis direction of FIG. 2. The gate electrode GE may form one terminal of a three terminal switching element such as a thin-film transistor ("TFT") along with a source electrode SE and a drain electrode DE, which will be described later.

The gate wiring (GL and GE) may include or contain at least one of an aluminum (Al)-based metal, including an Al alloy, a silver-(Ag)-based metal, including an Ag alloy, a copper (Cu)-based metal, including a Cu alloy, a molybdenum (Mo)-based metal, including a Mo alloy, chromium (Cr), titanium (Ti) and tantalum (Ta), but the invention is not limited thereto. That is, any metal or polymer material having suitable physical properties for realizing a desired display device may be used as the material of the gate wiring (GL and GE).

The gate wiring (GL and GE) may have a single-layer structure, but the invention is not limited thereto. That is, alternatively, the gate wiring (GL and GE) may have a multilayer structure, such as a double- or triple-layer structure.

A gate insulating layer GI may be disposed on the gate wiring (GL and GE). The gate insulating layer GI may cover the gate wiring (GL and GE), and may be formed on the entire surface of the first substrate 500.

The gate insulating layer GI may be disposed or formed of a combination of at least one selected from an inorganic insulating material such as silicon oxide (SiOx) or silicon nitride (SiNx), benzocyclobutene ("BCB"), an acrylic material, and an organic insulating material such as polyimide ("PI"), but the invention is not limited thereto. That is, the material of the gate insulating layer GI is not particularly limited.

A semiconductor pattern layer 700 may be disposed on the gate insulating layer GI.

The semiconductor pattern layer 700 may include or contain amorphous silicon or polycrystalline silicon, but the invention is not limited thereto. That is, alternatively, the semiconductor pattern layer 700 may contain an oxide semiconductor.

The semiconductor pattern layer 700 may have various shapes such as an island shape or a linear shape in the top plan view. In response to the semiconductor pattern layer 700 having a linear shape, the semiconductor pattern layer 700 may be provided below the data line DL taken in the cross-sectional thickness direction of the display device and may extend to overlap the top of the gate electrode GE.

In an exemplary embodiment, the semiconductor pattern layer 700 may be patterned to define substantially the same shape as data wiring (DL, SE, DE and 150) in all areas except for a channel portion of the TFT. That is, the semiconductor pattern layer 700 may be disposed to overlap the data wiring (DL, SE, DE and 150) in all the areas except for the channel portion. The channel portion defined by the semiconductor layer 700 may be disposed between the source electrode SE and the drain electrode DE, which face each other. The channel portion electrically connects the source electrode SE and the drain electrode DE to each other, and the planar shape of the channel portion is not particularly limited.

An ohmic contact layer (not illustrated) doped with a relatively high concentration of n-type impurities may be disposed on the semiconductor pattern layer 700. The ohmic contact layer may overlap the entire semiconductor pattern layer 700 or a portion of the semiconductor pattern layer 700. In response to the semiconductor pattern layer 700 containing an oxide semiconductor, the ohmic contact layer may not be provided.

Where the semiconductor pattern layer 700 includes or is formed of an oxide semiconductor, the semiconductor pattern layer 700 may include or contain zinc oxide (ZnO), and the top of the semiconductor pattern layer 700 may be doped with at least one selected from gallium (Ga) ions, indium (In) ions, stannum (Sn) ions, zirconium (Zr) ions, hafnium (Hf) ions, cadmium (Cd) ions, silver (Ag) ions, copper (Cu) ions, germanium (Ge) ions, gadolinium (Gd) ions, titanium (Ti), and vanadium (V) ions. In an exemplary embodiment, for example, the semiconductor pattern layer 700 may include or contain at least one oxide semiconductor selected from ZnO, ZnGaO, ZnInO, ZnSnO, GaInZnO, CdO, InO, GaO, SnO, AgO, CuO, GeO, GdO, HfO, TiZnO, InGaZnO, and InTiZnO, but the invention is not limited thereto. That is, the type of the oxide semiconductor of the semiconductor pattern layer 700 is not particularly limited.

The data wiring (DL, SE, DE and 150) may be disposed on the semiconductor pattern layer 700. The data wiring (DL, SE, DE and 150) includes a data line DL, the source electrode SE, the drain electrode DE and a drain electrode extension 150.

The data line DL may lengthwise extend in the second direction, for example, a Y-axis direction of FIG. 2, and may intersect the gate line GL. The source electrode SE may be branched off from the data line DL and may extend to overlap the top of the semiconductor layer 700.

The drain electrode DE may be spaced from the source electrode SE, and may be disposed to face the source electrode SE over the semiconductor pattern layer 700 relative to the gate electrode GE or the channel portion. The drain electrode extension 150 may extend from the drain electrode DE and may be formed in one body with the drain electrode DE. The drain electrode extension 150 may have a relatively larger width than the drain electrode DE and may facilitate an electric contact with a pixel electrode PE. In an alternative exemplary embodiment, the drain electrode extension 150 may not be provided, such that the pixel electrode PE directly contacts, and is electrically connected to, the drain electrode DE.

The data wiring (DL, SE, DE and 150) may have a single- or multilayer structure including or formed of a metal such as nickel (Ni), cobalt (Co), Ti, Ag, Cu, Mo, Al, beryllium (Be), Nb, gold (Au), iron (Fe), selenium (Se), or Ta or an alloy of the metal comprising at least one selected from Ti, Zr, tungsten (W), Ta, Nb, platinum (Pt), Hf, oxygen (O) and nitrogen (N), but the invention is not limited thereto. That is, the material of the data wiring (DL, SE, DE and 150) is not particularly limited.

FIG. 2 illustrates that a single TFT is disposed in a single pixel, but the invention is not limited thereto. That is, in an alternative exemplary embodiment, more than one TFT may be provided in each pixel.

A color filter CF may be disposed on the data wiring (DL, SE, DE and 150) and the semiconductor pattern layer 700. The color filter CF may include at least one selected from a blue filter, a green filter and a red filter. In an exemplary embodiment, the blue filter, the green filter and the red color filter may have different heights from one another.

A contact hole CNT, which exposes the drain electrode extension 150, may be provided in the color filter CF. Due to the contact hole CNT, the drain electrode extension 150 may be exposed, and as a result, the pixel electrode PE may be electrically connected to the drain electrode DE at the contact hole CNT.

The pixel electrode PE may be disposed on the color filter CF. The pixel electrode PE may be electrically connected to the drain electrode DE via the contact hole CNT, which is formed in the color filter CF.

In an exemplary embodiment, the pixel electrode PE may include or be formed of a transparent conductor such as indium tin oxide ("ITO") or indium zinc oxide ("IZO") or a reflective conductor such as Al.

FIG. 2 illustrates the pixel electrode PE as having a plate shape, but the invention is not limited thereto. That is, in an alternative exemplary embodiment, the pixel electrode PE may have a structure for which one or more slits are defined therein. In another alternative exemplary embodiment, a plurality of pixel electrodes PE may be provided in each pixel, such that different voltages may be applied to the plurality of pixel electrodes PE.

Although not specifically illustrated, a black matrix may be disposed on the color filter CF and the pixel electrode PE. The black matrix may lengthwise extend in the first direction to cover the gate line GL and/or may lengthwise extend in the second direction to cover the data line DL.

The black matrix blocks incident light from outside the display device according to the exemplary embodiment. The black matrix may include or be formed of a photosensitive resin comprising a black pigment, but the invention is not limited thereto. That is, the material of the black matrix is not particularly limited, and any material having the physical properties required to block incident light may be used to form the black matrix.

In an alternative exemplary embodiment, the black matrix may be disposed or formed on an upper substrate facing the first substrate 500, e.g., a second substrate 1000, instead of being disposed or formed on the first substrate 500.

A first alignment layer ALN1 may be disposed on the first substrate 500 which includes a plurality of pixels. The first alignment layer ALN1, which is for an initial alignment of a liquid crystal layer LC between the first substrate 500 and the second substrate 1000, may include a polymer material that causes one of decomposition, dimerization and isomerization upon exposure to light (for example, ultraviolet ("UV") or laser light). The first alignment layer ALN1 may also include or be formed of a polymer polymerized with reactive mesogens.

The first alignment layer ALN1 may include or be formed of, but is not limited to, for example, PI.

The first alignment layer ALN1 may cover the entire display area DA and may extend to the non-display area NDA. That is, the first alignment layer ALN1 may cover the entire display area DA and a portion of the non-display area NDA.

Elements provided in the non-display area NDA will hereinafter be described.

Referring to FIGS. 4 and 5, a first insulating layer IL1 may be disposed in the non-display area NDA of the first substrate 500. The first insulating layer IL1 may include or be formed of, for example, an inorganic insulating material such as silicon oxide (SiOx) or silicon nitride (SiNx), BCB, an acrylic material, and an organic insulating material such as PI, but the invention is not limited thereto. That is, the material of the first insulating layer IL1 is not particularly limited.

The first insulating layer IL1 may include or be formed of substantially the same material as the gate insulating layer GI in the display area DA. In an exemplary embodiment, for example, the first insulating layer IL1 and the gate insulating layer GI may be simultaneously formed in one body with each other on the first substrate 500, but the invention is not limited thereto. That is, alternatively, the first insulating layer IL1 may be formed of a different material from the gate insulating layer GI.

The dam patterns DP may be disposed on the first insulating layer IL1. The dam patterns DP may include the first dam pattern DP1 and the second dam pattern DP2.

The first dam pattern DP1 may be disposed or formed in the non-display area NDA and may lengthwise extend in the second direction. FIG. 1 illustrates the first dam pattern DP1 as lengthwise extending in the Y-axis direction, but the direction in which the dam pattern lengthwise extends is not particularly limited to the Y-axis direction. That is, the direction in which the dam pattern lengthwise extends may be the X-axis direction depending on the location of the first dam pattern DP1.

The first dam pattern DP1 may be disposed to lengthwise extend in parallel to an outer side of the display area DA. More specifically, in response to the display area DA being rectangular, the first dam pattern DP1 may be disposed near, and may lengthwise extend in parallel to, at least one of the four sides of the display area DA.

The first dam pattern DP1 may include or be defined by the first stem portion ST1 and the first branch portion BR1. The first stem portion ST1 may be bar-shaped and may lengthwise extend in the second direction. In response to the display area DA being rectangular, the first stem portion ST1 may be disposed near, and may lengthwise extend in parallel to, at least one of the four sides of the display area DA.

The first branch portion BR1 may be branched off, and may lengthwise extend, from the first stem portion ST1.

The first branch portion BR1 may lengthwise extend in the first direction, which is different from the second direction. FIG. 4 illustrates the first branch portion BR1 as lengthwise extending in the X-axis direction, but the invention is not limited thereto. More specifically, FIG. 4 illustrates the first stem portion ST1 and the first branch portion BR1 as lengthwise extending in the Y-axis direction and the X-axis direction, respectively, but the invention is not limited thereto. That is, alternatively, depending on the location of the first dam pattern DP1, the first stem portion ST1 may lengthwise extend in the X-axis direction, and the first branch portion BR1, which is branched off from the first stem portion ST1, may lengthwise extend in the Y-axis direction. Also, FIG. 4 illustrates lengths of the first stem portion ST1 and the first branch portion BR1 as crossing or intersecting each other at right angles, but the invention is not limited thereto. That is, alternatively, the first stem portion ST1 and the first branch portion BR1 may lengthwise extend, forming an acute angle or an obtuse angle with each other.

A plurality of first branch portions BR1 may be branched off from a single first stem portion ST1. The plurality of first branch portions BR1 may be a predetermined distance from one another along a length of the first stem portion ST1.

The second dam pattern DP2 may be disposed near the first dam pattern DP1. The second dam pattern DP2 may include or be defined by the second stem portion ST2 and the second branch portion BR2.

The second stem portion ST2 may be bar-shaped and may lengthwise extend in the second direction. The second stem portion ST2 may be disposed lengthwise in parallel to the first stem portion ST1. That is, the first stem portion ST1 and the second stem portion ST2 may be a predetermined distance from each other and may lengthwise extend in parallel to each other. In response to the display area DA being rectangular, the second stem portion ST2 may be disposed near, and may lengthwise extend in parallel to, at least one of the four sides of the display area DA.

The second branch portion BR2 may be branched off, and may lengthwise extend, from the second stem portion ST2. The second branch portion BR2 may lengthwise extend in the first direction, which is different from the second direction. FIG. 4 illustrates the second branch portion BR2 as lengthwise extending in the X-axis direction, but the invention is not limited thereto. More specifically, FIG. 4 illustrates the second stem portion ST2 and the second branch portion BR2 as lengthwise extending in the Y-axis direction and the X-axis direction, respectively, but the invention is not limited thereto. That is, alternatively, depending on the location of the second dam pattern DP2, the second stem portion ST2 may lengthwise extend in the X-axis direction, and the second branch portion BR2, which is branched off from the first stem portion ST2, may lengthwise extend in the Y-axis direction. Also, FIG. 4 illustrates lengths of the second stem portion ST2 and the second branch portion BR2 as crossing each other at right angles, but the invention is not limited thereto. That is, alternatively, the second stem portion ST2 and the second branch portion BR2 may lengthwise extend, forming an acute angle or an obtuse angle with each other.

A plurality of second branch portions BR2 may be branched off from a single second stem portion ST2. The plurality of second branch portions BR2 may be a predetermined distance from one another along a length of the second stem portion ST2.

The first branch portion BR1 of the first dam pattern DP1 and the second branch portion BR2 of the second dam pattern DP2 may be a predetermined distance from each other in the first direction. That is, there may be provided a gap between the first branch portion BR1 and the second branch portion BR2 in the first direction. In an exemplary embodiment of manufacturing the display device, the gap between the first branch portion BR1 and the second branch portion BR2 may contain or limit movement of the first alignment layer ALN1 during the application of the first alignment layer ALN1 in the display area DA such that overflowing of the first alignment layer ALN1 from the display area DA and spreading to the non-display area NDA the may be reduced or effectively prevented.

The first branch portion BR1 and the second branch portion BR2 may be disposed to face each other in the first direction. The first branch portion BR1 and the second branch portion BR2 may be disposed between the first stem portion ST1 and the second stem portion ST2. As illustrated in FIG. 4, the first branch portion BR1 and the second branch portion BR2 may be disposed on a line with each other in the first direction. That is, the first branch portion BR1 and the second branch portion BR2 may be aligned with each other.

In an exemplary embodiment, the first dam pattern DP1 and the second dam pattern DP2 may include or be formed of substantially the same material as the color filter CF in the display area DA, such as due to the color filter CF and the dam patterns DP being simultaneously formed in the display area DA and the non-display area NDA, respectively, using the same material, in an exemplary embodiment of manufacturing the display device. However, the invention is not limited to this exemplary embodiment. That is, alternatively, the color filter CF in the first display area DA and the dam patterns DP in the non-display area NDA may be formed independently by separate processes.

In an exemplary embodiment, the dam pattern DP may include or be formed of substantially the same material as the blue filter CF to secure a sufficient height for the dam patterns DP to properly perform functions thereof.

In an exemplary embodiment, the first dam pattern DP1 and the second dam pattern DP2 may have substantially the same height in a cross-sectional thickness direction, such as due to the first dam pattern DP1 and the second dam pattern DP2 being formed of the same material and then being patterned at the same time, in an exemplary embodiment of manufacturing the display device. However, the structure of the dam patterns DP is not limited to this exemplary embodiment.

In another exemplary embodiment, the first dam pattern DP1 and the second dam pattern DP2 may be formed using different materials, such that the first dam pattern DP1 and the second dam pattern DP2 may have different heights from each other in the cross-sectional thickness direction.

Referring to FIG. 5, the first alignment layer ALN1 may be disposed on the first insulating layer IL1 and the dam patterns DP. The first alignment layer ALN1 may at least partially cover the dam patterns DP. That is, the first alignment layer ALN1 may at least partially overlap the dam patterns DP. More specifically, as illustrated in FIG. 5, the first alignment layer ALN1 may overlap the first dam pattern DP1, but not the second dam pattern DP2, such as due to the first alignment layer ALN1 spreading into the non-display area NDA during the initial application of the first alignment layer ALN1 in the display area DA. The first alignment layer ALN1 may overlap the first stem portion ST1 and the first branch portion BR1 of the first dam pattern DP1. That is, the first dam pattern DP1 may be completely overlapped by the first alignment layer ALN1. In addition, the first alignment layer ALN1 may cover the gap between the first branch portion BR1 and the second branch portion BR2. One end or edge of the first alignment layer ALN1 may contact a sidewall of the second branch portion BR2 and/or a sidewall of the second stem portion ST2.

In an alternative exemplary embodiment to that illustrated in FIG. 5, the first dam pattern DP1 may be partially overlapped by the first alignment layer ALN1. In an exemplary embodiment, for example, the first alignment layer ALN1 may cover or overlap only the first stem portion ST1, may cover the first stem portion ST1 and a portion of the first branch portion BR1, or may cover a portion of the gap between the first branch portion BR1 and the second branch portion BR2.

During the application of the first alignment layer ALN1 in the display area DA, the first alignment layer ALN1 may spread into the non-display area NDA. If the first alignment layer ALN1 spreads to a seal pattern SLP, which will be described later, the adhesive performance of the seal pattern SLP may deteriorate. Where the non-display area NDA is sufficiently large, there is a clear limit in the degree to which the first alignment layer ALN1 spreads to the non-display area NDA due to the viscosity of the first alignment layer ALN1, and thus, the likelihood of the first alignment layer ALN1's interference with the adhesive performance of the seal pattern SLP decreases. However, since reducing the size of the non-display area NDA is desired to realize a narrow bezel of the display device, the spread of the first alignment layer ALN1 to the non-display area NDA is minimized.

As described above, since the first dam pattern DP1 and the second dam pattern DP2 are provided, the first alignment layer ALN1 completely overlapping the seal pattern SLP in the non-display area NDA during the application of the first alignment layer ALN1 in the display area DA may be reduced or effectively prevented. That is, even if the first alignment layer ALN1 spills over the first dam pattern DP1, the kinetic energy of the first alignment layer ALN1 may be distributed by the first branch portion BR1 and the second branch portion BR2, and the first alignment layer ALN1 may be partially contained in the gap between the first branch portion BR1 and the second branch portion BR2. As a result, the first alignment layer ALN1 completely spilling over the second dam pattern DP2 may be reduced or effectively prevented. Thus, the first alignment layer ALN1 overlapping the seal pattern SLP and thereby degrading the adhesive performance of the seal pattern SLP may be reduced or effectively prevented. That is, by using the dam patterns DP, a display device with a narrow bezel may be realized.

Other exemplary embodiments of display devices according to the invention will hereinafter be described. In FIGS. 1 to 12, like reference numerals denote like elements, and thus, detailed descriptions thereof will be omitted.

Figure 6:
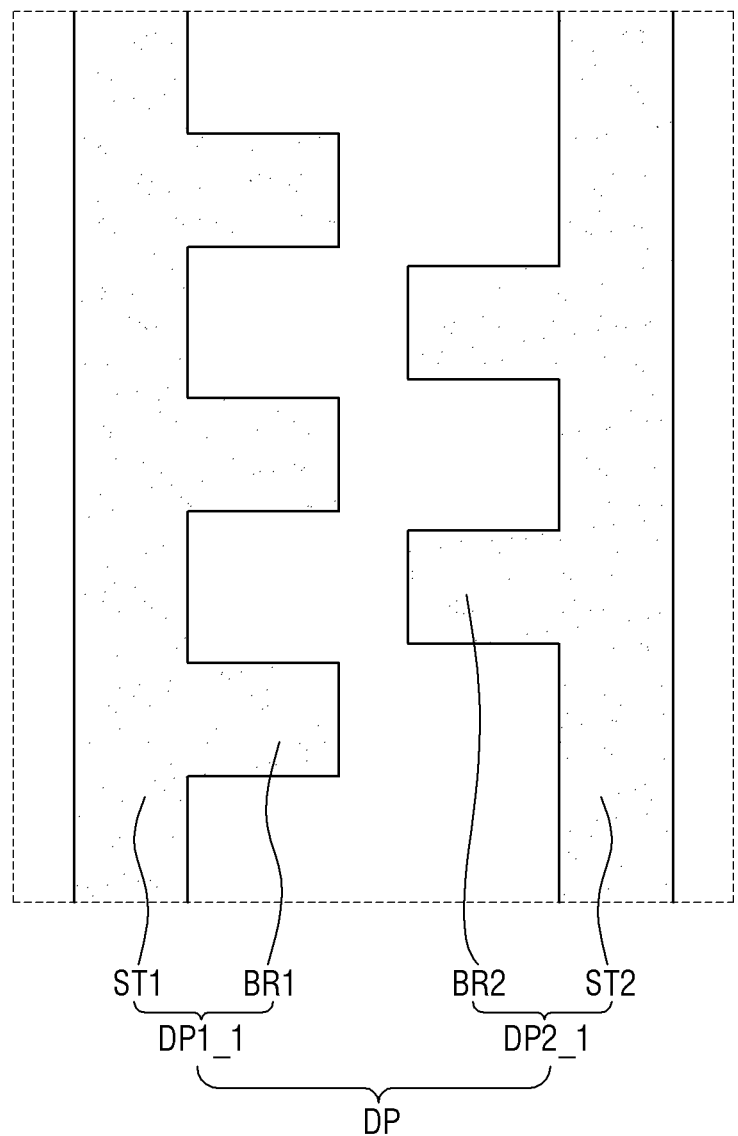
FIG. 6 is a partial enlarged top plan view of a modification of the area B in the display device of FIG. 1 according to the invention.

FIG. 6 is a partial enlarged top plan view of a modification of the area B in the display device according to the invention. Referring to FIG. 6, the modified display device according to the invention differs from the display device of FIG. 4 in that at least one first branch portion BR1 and at least one second branch portion BR2 are arranged in a staggered manner.

More specifically, for first and second dam pattern DP1_1 and DP2_1, the first branch portion BR1 and the second branch portion BR2 respectively thereof may be arranged in a staggered manner along a length of the stem portions. That is, the first branch portion BR1 and the second branch portion BR2 may be alternately arranged in a gap between a first stem portion ST1 and a second stem portion ST2. The first branch portion BR1 and the second branch portion BR2 may be misaligned with each other along the first direction.

In the exemplary embodiment, unlike in the exemplary embodiment of FIG. 4 in which the first branch portion BR1 and the second branch portion BR2 are disposed on a line with each other in the first direction, the first branch portion BR1 and the second branch portion BR2 may not overlap each other at all along the first direction or may only partially overlap each other along the first direction.

Even where the first branch portion BR1 and the second branch portion BR2 are arranged in a staggered manner, the kinetic energy of a first alignment layer ALN1 that is applied onto a display area DA and flows into a non-display area NDA may be distributed, thereby reducing or effectively preventing the first alignment layer ALN1 from spilling over a second dam pattern DP2.

Figure 7:
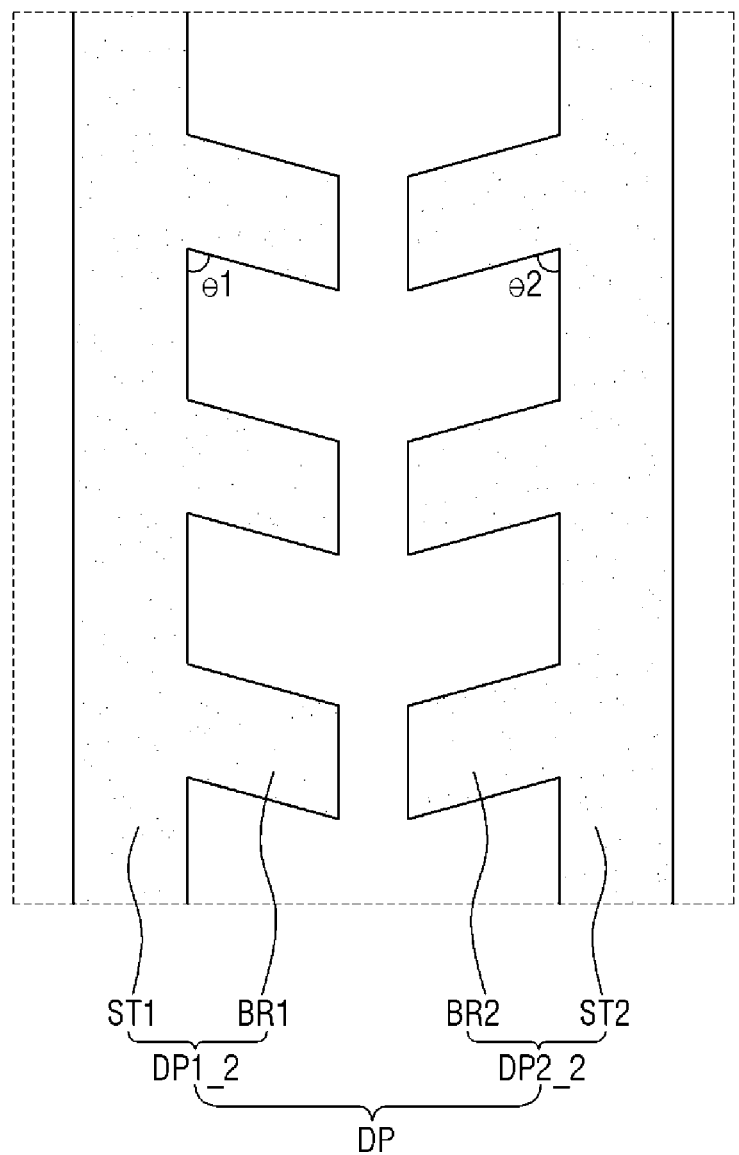
FIG. 7 is a partial enlarged top plan view of another modification of the area B in the display device of FIG. 1 according to the invention.

FIG. 7 is a partial enlarged top plan view of another modification of the area B in the display device according to the invention. Referring to FIG. 7, the modified display device according to the invention differs from the display device of FIG. 4 in that at least one first branch portion BR1 and at least one second branch portion BR2 lengthwise extend at a predetermined angle with respect to a direction perpendicular to the first direction.

More specifically, for first and second dam pattern DP1_2 and DP2_2, the first branch portion BR1 and the second branch portion BR2 respectively thereof may lengthwise extend at a predetermined angle with respect to an X-axis direction. In other words, a first angle θ1 between one side of the first branch portion BR1 and an inner side of a first stem portion ST1 and a second angle θ2 between one side of the second branch portion BR2 and an inner side of a second stem portion ST2 may be acute angles. In an exemplary embodiment, the first angle θ1 and the second angle θ2 may be substantially identical, but the invention is not limited thereto. That is, alternatively, the first angle θ1 and the second angle θ2 may be different from each other.

Figure 8:
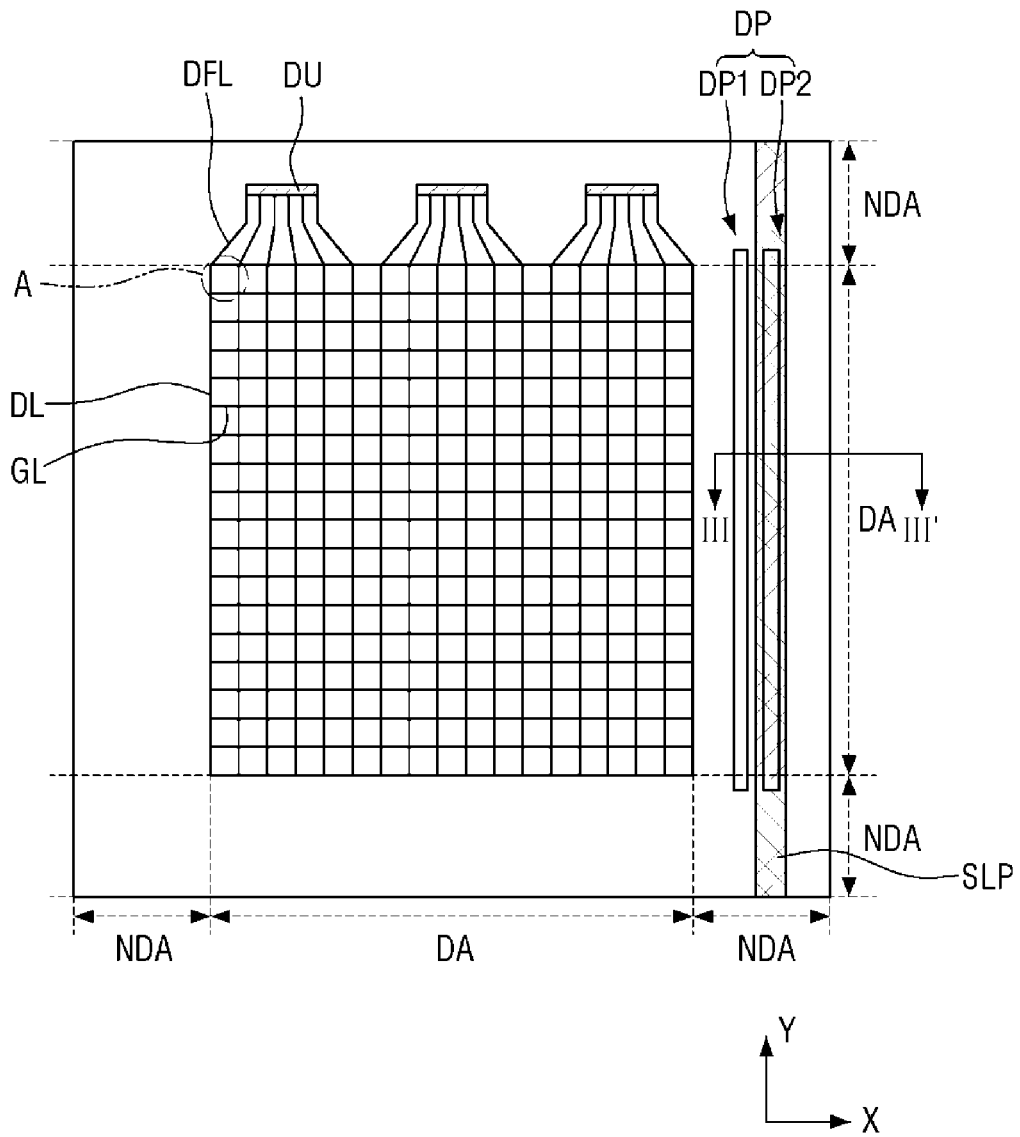
FIG. 8 is a top plan view of another exemplary embodiment of a display device according to the invention.
Figure 9:
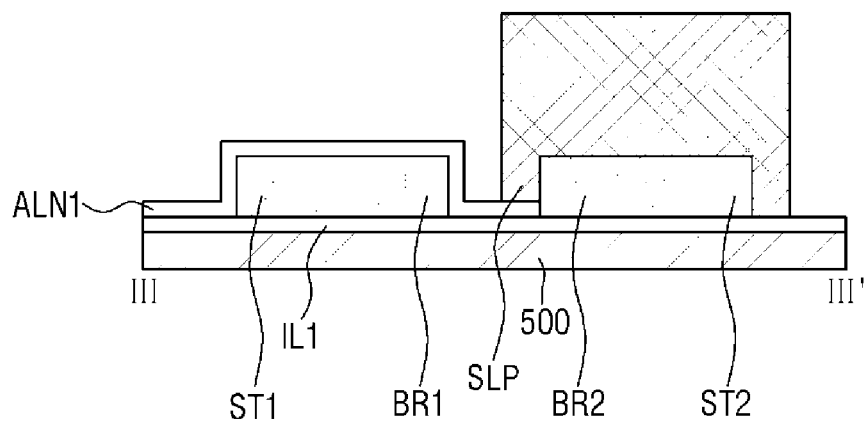
FIG. 9 is a cross-sectional view taken along line III-III' of FIG. 8.

FIG. 8 is a top plan view of another exemplary embodiment of a display device according to the invention. FIG. 9 is a cross-sectional view taken along line III-III' of FIG. 8. Referring to FIGS. 8 and 9, the display device differs from the display device of FIG. 1 in that a seal pattern SLP is further included, which is disposed on at least one side of a non-display area NDA.

More specifically, the seal pattern SLP may be disposed on at least one side of the non-display area NDA. The seal pattern SLP may bond a first substrate 500 and a second substrate 1000 together. That is, the seal pattern SLP may connect the first substrate 500 and the second substrate 1000 together.

In an exemplary embodiment, the seal pattern SLP may at least partially overlap a second dam pattern DP2. In other words, the seal pattern SLP may entirely or partially overlap a second stem portion ST2 and at least one second branch portion BR2. In an exemplary embodiment, for example, the seal pattern SLP may cover the entire second stem portion ST2 and the entire second branch portion BR2, the entire second stem portion ST2 and a portion of the second branch portion BR2, or only a portion of the second stem portion ST2.

The seal pattern SLP may be disposed on the outside of dam patterns DP, such that the dam patterns DP are between the seal pattern SLP and the first substrate 500. The dam patterns DP may be disposed between a display area DA and the seal pattern SLP in the top plan view.

The bottom of the seal pattern SLP may at least partially overlap a first alignment layer ALN1, the second dam pattern DP2 and a first insulating layer IL1. If more than half the area of the bottom of the seal pattern SLP overlaps the first alignment layer ALN1, the adhesive performance of the seal pattern SLP may considerably decrease. That is, in order for the seal pattern SLP to maintain effective adhesive performance to bond the first substrate 500 and the second substrate 100 together, the area of overlap or contact between the bottom of the seal pattern SLP and the first alignment layer ALN1 is smaller than half a total planar area of the bottom of the seal pattern SLP, e.g., the total planar area of the bottom of the seal pattern SLP divided by 2.

In response to the seal pattern SLP at least partially overlapping the second dam pattern DP2, the planar area required to bond the first substrate 500 and the second substrate 1000 may be reduced, and thus, a display device with a narrow bezel may be realized.

Figure 10:
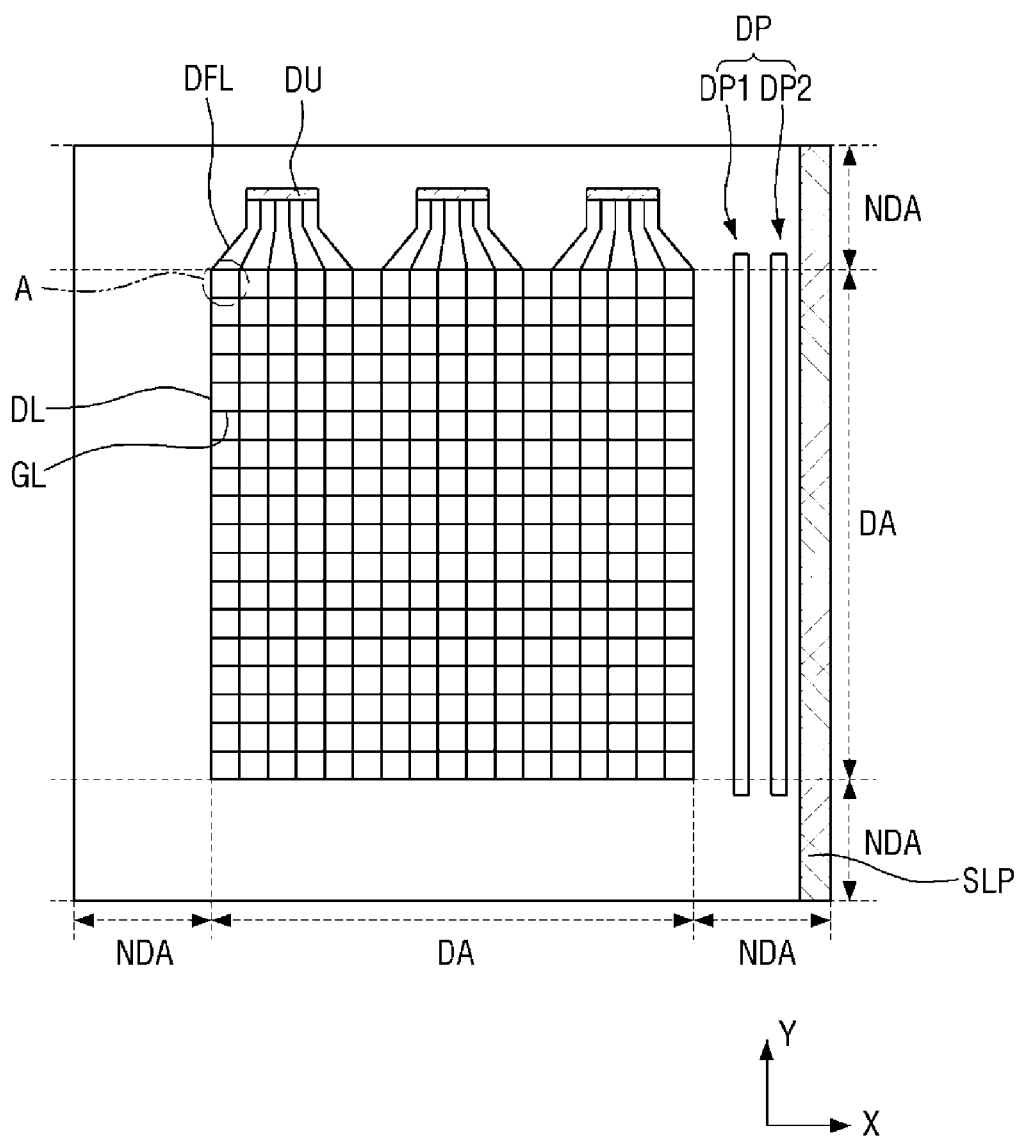
FIG. 10 is a top plan view of still another exemplary embodiment of a display device according to another exemplary embodiment of the invention.

FIG. 10 is a top plan view of still another exemplary embodiment of a display device according to invention. Referring to FIG. 10, the display device differs from the display device of FIG. 9 in that a seal pattern SLP is provided on the outside of a second dam pattern DP2.

More specifically, the seal pattern SLP may be provided on the outside of the second dam pattern DP2 as an outermost dam pattern in the non-display area, in the top plan view. The seal pattern SLP may not overlap the second dam pattern DP2. In response to the seal pattern SLP being disposed on the outside of the second dam pattern DP2, the seal pattern SLP may not overlap a first alignment layer ALN1, and thus, the adhesive performance of the seal pattern SLP may be improved.

Figure 11:
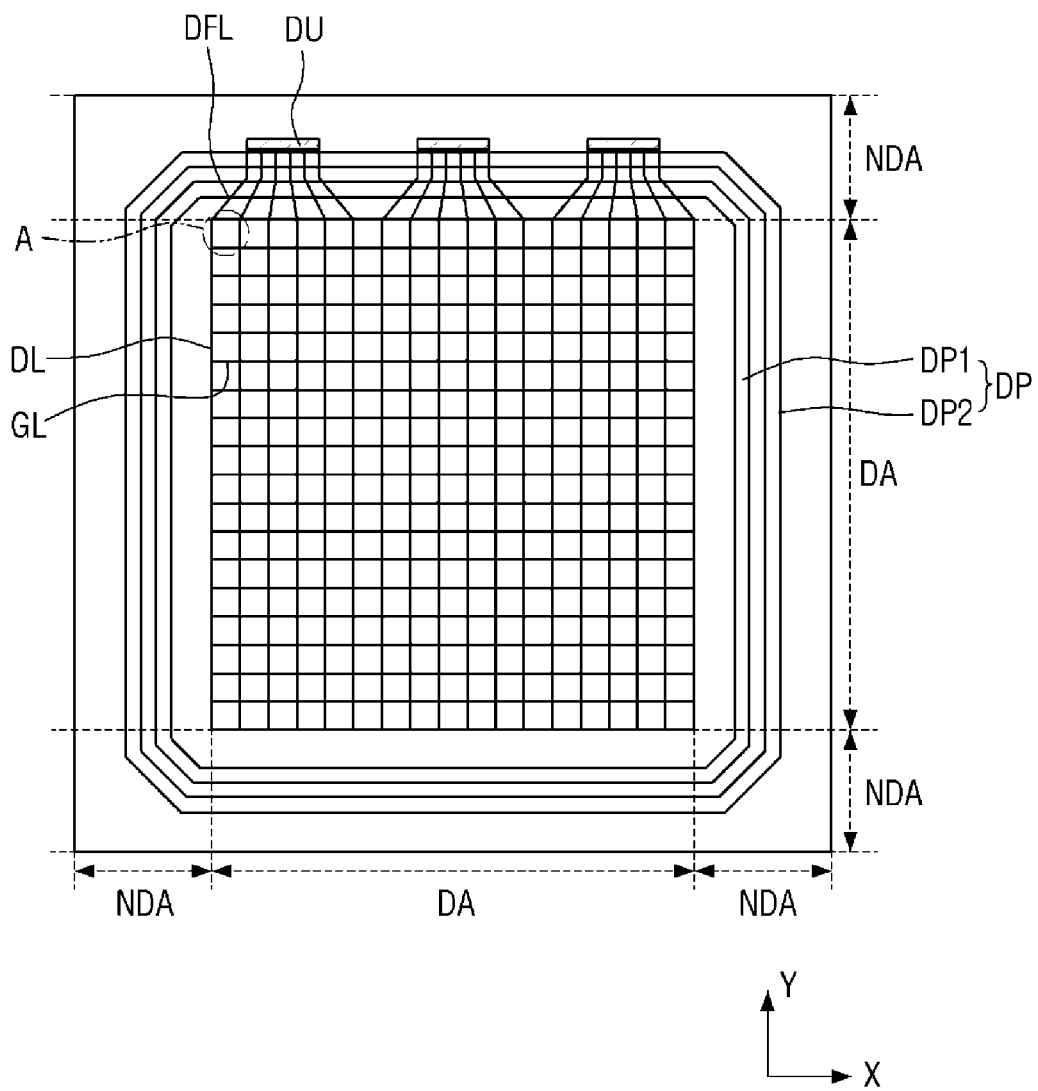
FIG. 11 is a top plan view of yet another exemplary embodiment of a display device according to the invention.

FIG. 11 is a top plan view of yet another exemplary embodiment of a display device according to the invention.

Referring to FIG. 11, the display device differs from the display device of FIG. 1 in that dam patterns DP are provided along the circumference of a display area DA. As mentioned above, the dam patterns DP may be disposed on at least one side of a non-display area NDA. In response to the display area DA being rectangular, the dam patterns DP may be disposed near at least one of the four sides that form the circumference of the display area DA. In an exemplary embodiment, for example, the dam patterns DA may be disposed near two or more sides of the display area DA.

In an exemplary embodiment, the dam patterns may be disposed near the four sides that form the circumference of the display area DA. That is, the dam patterns DP may form a closed polygonal shape, and the display area DA may be provided in the space enclosed by the dam patterns DP. As forming the closed polygonal shape, the dam patterns DP are not discrete members, different from the structures in previous exemplary embodiments.

More specifically, a first dam pattern DP1 may be continuously disposed to surround the four sides of the display area DA, and a second dam pattern DP2 may be continuously disposed on the outside of the first dam pattern DP1 to surround the circumference of the first dam pattern DP1.

The dam patterns DP may be rectangular to be completely parallel to each side of the display area DA, but the invention is not limited thereto. Alternatively, as illustrated in FIG. 11, the dam patterns DP may define side portions thereof lengthwise parallel to sides of the display area DA and corner portions thereof lengthwise extending in a diagonal direction relative to the sides of the display area DA. More specifically, the corner portions of the dam patterns DP may lengthwise extend in a direction tilted at a predetermined angle from a first or second direction in areas, at the corner portions of the display area DA. In response to the corner portions of the dam patterns DP lengthwise extending in a diagonal direction in the areas near the corner portions of the display area DA, the size of elements within a non-display area NDA adjacent to the corner portions of the display area DA may be reduced. Accordingly, by reducing the size of the entire display area NDA relative to the display area DA, a display device with a narrow bezel may be realized.

Figure 12:
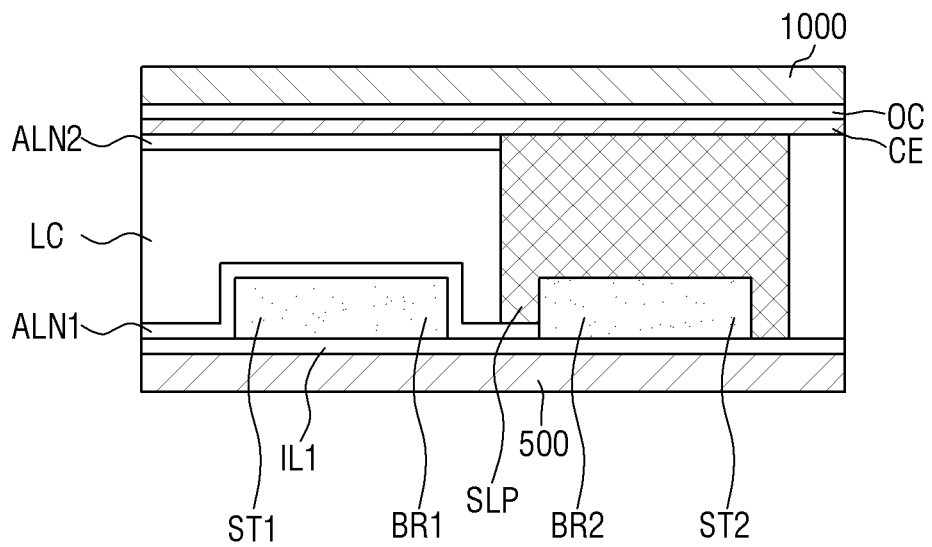
FIG. 12 is a cross-sectional view of yet another exemplary embodiment of a display device according to the invention.

FIG. 12 is a cross-sectional view of yet another exemplary embodiment of a display device according to another exemplary embodiment of the invention.

Referring to FIG. 12, the display device may include a first substrate 500 and may also include a second substrate 1000, which faces the first substrate 500.

The second substrate 1000 may be disposed to face the first substrate 500.

The second substrate 1000 may include or be formed of a heat-resistant and transmissive material. The second substrate 1000 may include or be formed of, for example, transparent glass or plastic, but the invention is not limited thereto.

An overcoat layer OC may be disposed on the second substrate 1000. The overcoat layer OC may include or be formed of an organic or inorganic insulating material. The overcoat layer OC may be disposed or formed on the entire second substrate 1000 and may serve as a planarization layer.

A common electrode CE may be disposed on the overcoat layer OC. The common electrode CE may be a patternless front electrode such as excluding slit patterns or branch patterns. A common voltage may be applied to the common electrode CE. In response to different voltages being applied to the common electrode CE and a pixel electrode PE, an electric field may be formed between the common electrode CE and the pixel electrode PE, and by using the electric field, the motion of liquid crystal molecules of a liquid crystal layer LC between the first substrate 500 and the second substrate 1000 may be controlled.

A second alignment layer ALN2 may be disposed on the common electrode CE.

The second alignment layer ALN2, which is for an initial alignment of the liquid crystal layer LC between the first substrate 500 and the second substrate 1000, may comprise a polymer material that causes one of decomposition, dimerization, and isomerization upon exposure to light (for example, UV or laser light). The second alignment layer ALN2 may also include or be formed of a polymer polymerized with reactive mesogens.

The second alignment layer ALN2 may include or be formed of, but is not limited to, for example, PI.

The second alignment layer ALN2 may cover a portion of the common electrode CE.

As described above, the first substrate 500 and the second substrate 1000 may be connected to each other by a seal pattern SLP. The top of the seal pattern SLP may at least partially overlap the common electrode CE and the second alignment layer ALN2. Alternatively, the top of the seal pattern SLP may contact only the common electrode CE, and not the second alignment layer ALN2.

An exemplary embodiment of a manufacturing method of a display device, according to the invention, will hereinafter be described. In FIGS. 1 to 17, like reference numerals denote like elements, and thus, detailed descriptions thereof will be omitted.

FIGS. 13 to 17 are cross-sectional views illustrating an exemplary embodiment of a manufacturing method of a display device, according to the invention.

Referring to FIGS. 13 to 17, the manufacturing method includes: preparing a first substrate 500 on which a display area DA and a non-display area NDA on the outside of the display area DA are defined; and forming dam patterns DP in the non-display area NDA, the dam patterns DP including a first dam pattern DP1 defining a first stem portion ST1, which lengthwise extends in a second direction, and at least one first branch portion BR1 which is branched off and extends from the first stem portion ST1, and a second dam pattern DP2 defining a second stem portion ST2, which lengthwise extends in the second direction, and at least one second branch portion BR2 which is branched off and extends from the second stem portion ST2 and is spaced from and faces the first branch portion BR1.

Figure 13:
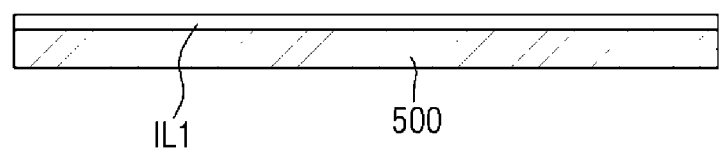
FIGS. 13 to 17 are cross-sectional views illustrating an exemplary embodiment of a manufacturing method of a display device, according to invention.

More specifically, referring to FIG. 13, the first substrate 500 for which the display area DA and the non-display area NDA are defined is prepared. The display area DA and the non-display area NDA are substantially identical to their respective counterparts in the display devices according to previously-described exemplary embodiments of the invention, and thus, detailed descriptions thereof will be omitted.

Thereafter, a first insulating layer IL1 may be formed on the first substrate 500. The first insulating layer IL1 may be formed by, for example, chemical vapor deposition ("CVD") or physical coating, but the invention is not limited thereto.

Figure 14:
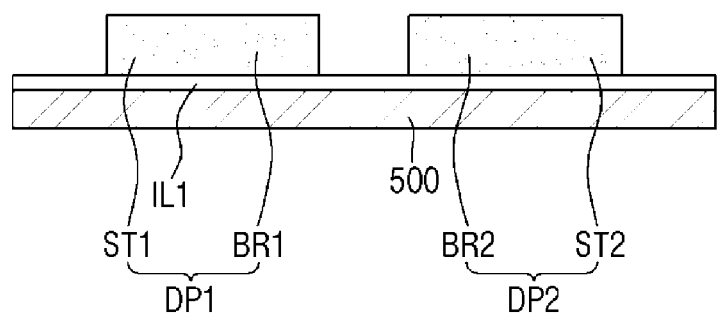

Thereafter, referring to FIG. 14, the dam patterns DP are formed on the first insulating layer IL1. The dam patterns DP may be formed by forming and then patterning one or more material layers. As described above, the dam patterns DP may be formed of substantially the same material as a color filter CF in the display area DA. In an exemplary embodiment, the dam patterns DP and the color filter CF in the display area DA may be formed at the same time. In an exemplary embodiment, for example, the dam patterns DP and a blue filter in the display area DA may be formed at the same time.

The shape of the dam patterns DP may be substantially identical to the shape of the dam patterns DP in the display devices according to previously-described exemplary embodiments of the invention, and thus, a detailed description thereof will be omitted.

Figure 15:
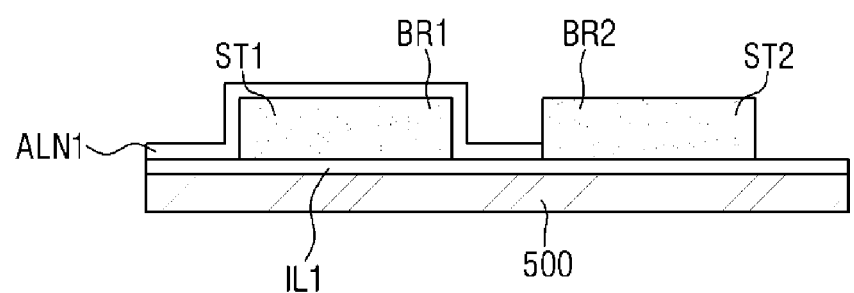

Thereafter, referring to FIG. 15, a first alignment layer ALN1 may be formed on the dam patterns DP to at least partially cover the dam patterns DP.

As described above, during the formation of the first alignment layer ALN1 in the display area DA, a portion of the first alignment layer ALN1 may spread into the non-display area NDA. That is, as already discussed above with reference to FIG. 5, the portion of the first alignment layer ALN1 may overlap the first stem portion ST1 and the first branch portion BR1 of the first dam pattern DP1. In other words, the first dam pattern DP1 may be completely overlapped by the first alignment layer ALN1. In addition, the first alignment layer ALN1 may also cover the gap between the first branch portion BR1 and the second branch portion BR2. A distal edge of the portion of the first alignment layer ALN1 may contact a sidewall of the second branch portion BR2 and/or a sidewall of the second stem portion ST2.

In an alternative exemplary embodiment, the first dam pattern DP1 may be partially overlapped by the first alignment layer ALN1. In an exemplary embodiment, for example, the first alignment layer ALN1 may cover only the first stem portion ST1, may cover the first stem portion ST1 and a portion of the first branch portion BR1, or may cover a portion of the gap between the first branch portion BR1 and the second branch portion BR2.

Figure 16:
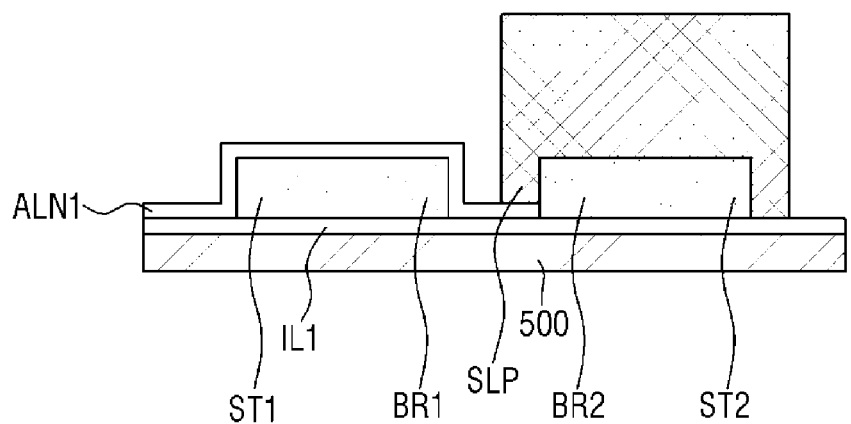

Thereafter, referring to FIG. 16, a seal pattern SLP may be formed on the dam patterns DP. As described above with reference to FIG. 8, the seal pattern SLP may at least partially overlap the dam patterns DP. Alternatively, the seal pattern SLP may be provided on the outside of the dam patterns DP. In response to the seal pattern SLP being disposed to at least partially overlap the dam patterns DP, a portion of the bottom of the seal pattern SLP may overlap the first alignment layer ALN1.

Figure 17:
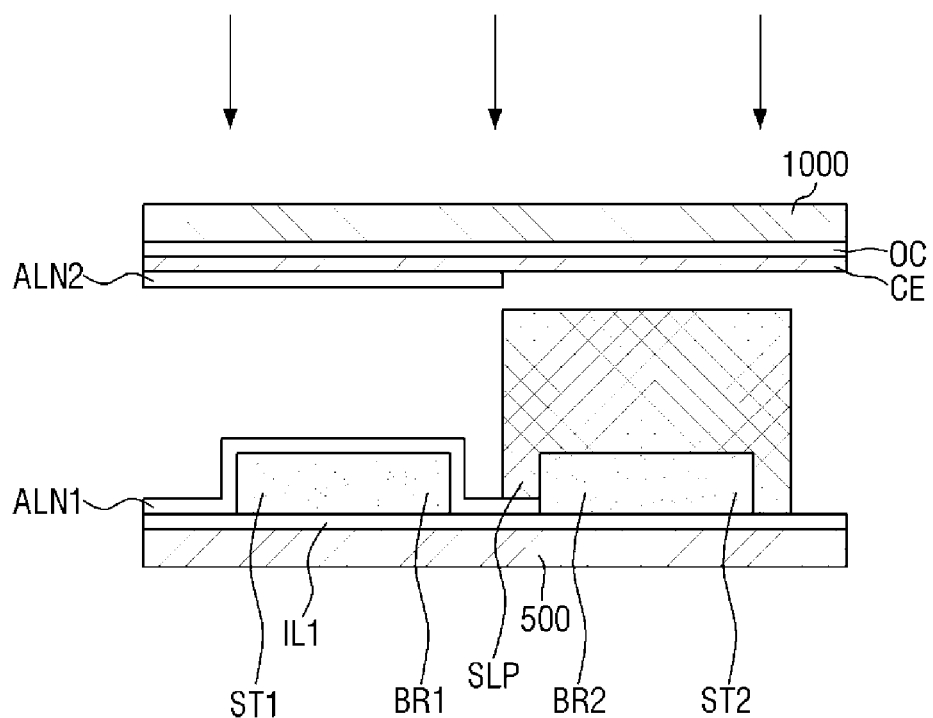

Thereafter, referring to FIG. 17, a second substrate 1000, which is disposed facing the first substrate 500, may be bonded to the first substrate 500. The second substrate 1000 may be substantially identical to the previously-described embodiment thereof of FIG. 12, and thus, a detailed description thereof will be omitted. That is, the first substrate 500 and the second substrate 1000 may be disposed close to each other and may then be connected to each other by the seal pattern SLP disposed therebetween to complete the display device.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A display device, comprising:
a first substrate on which a display area, and a non-display area which is outside the display area, are defined; and
a dam pattern disposed on at least one side of the display area and in the non-display area, the dam pattern including:
a first dam pattern defining a first stem portion thereof which lengthwise extends in a first direction, and a first branch portion which extends from the first stem portion, and
a pattern defining a second stem portion thereof which lengthwise extends in the first direction, and a second branch portion which extends from the second stem portion,
wherein the second branch portion of the second dam pattern is spaced from and faces the first branch portion of the first dam pattern.

2. The display device of claim 1, wherein the first branch portion and the second branch portion lengthwise extend in a second direction, which is perpendicular to the first direction.

3. The display device of claim 1, wherein the first branch portion and the second branch portion are arranged in a staggered manner in the first direction.

4. The display device of claim 1, wherein
the first branch portion and an inner side of the first stem portion form a first angle,
the second branch portion and an inner side of the second stem portion form a second angle, and
at least one of the first angle and the second angle is an acute angle.

5. The display device of claim 1, further comprising:
an alignment layer disposed on the first substrate and partially overlapping the dam pattern.

6. The display device of claim 5, wherein the alignment layer overlaps the first stem portion and the first branch portion of the first dam pattern.

7. The display device of claim 5, wherein the spaced apart first branch portion and second branch portion define a gap therebetween, and
the alignment layer partially overlaps the gap.

8. The display device of claim 1, further comprising:
a seal pattern which is disposed in the non-display area and combines the first substrate with a second substrate facing the first substrate.

9. The display device of claim 8, wherein the seal pattern partially overlaps the dam pattern.

10. The display device of claim 9, wherein the seal pattern completely overlaps the second stem portion and the second branch portion of the second dam pattern in a top plan view.

11. The display device of claim 8, further comprising:
an alignment layer disposed on the first substrate and partially overlapping the dam pattern,
wherein a bottom surface of the seal pattern contacts the alignment layer disposed partially overlapping the dam pattern.

12. The display device of claim 11, wherein an area of contact between the bottom surface of the seal pattern and the alignment layer is smaller than half a total area of the bottom surface of the seal pattern.

13. The display device of claim 8, wherein the seal pattern is disposed non-overlapping the dam pattern.

14. The display device of claim 1, wherein
sides of the display area define a circumference of the display area,
the dam pattern is provided in plural to be respectively disposed at each side of the display area to surround the circumference of the display area.

15. The display device of claim 14, wherein for the dam patterns respectively disposed at each side of the display area,
the first and second dam patterns are each respectively disposed at adjacent sides of the display area to respectively define first and second stem portions lengthwise extended parallel to the adjacent sides of the display area,
the first and second dam patterns respectively further define first and second inclined portions thereof which respectively connect the first and second stem portions thereof parallel to the adjacent sides of the display area, to each other, and
the first and second inclined portions each extend in a direction inclined from the first direction at corner portions of the display area.

16. The display device of claim 1, wherein
four sides of the display area define a rectangular circumference thereof, and
the dam pattern is disposed adjacent to at least one of the four sides which define the rectangular circumference of the display area.

17. A manufacturing method of a display device, comprising:
preparing a first substrate on which a display area, and a non-display area which is outside the display area, are defined; and
forming a dam pattern in the non-display area, the dam pattern including:
a first dam pattern defining a first stem portion thereof which lengthwise extends in a first direction, and a first branch portion thereof which extends from the first stem portion, and
a second dam pattern defining a second stem portion thereof which lengthwise extends in the first direction, and a second branch portion which extends from the second stem portion,
wherein the second branch portion is spaced from and faces the first branch portion.

18. The manufacturing method of claim 17, further comprising:
forming a first alignment layer in the display area, the first alignment extended to partially overlap the dam pattern.

19. The manufacturing method of claim 17, further comprising:
forming a seal pattern on the first substrate and partially overlapping the dam pattern.

20. The manufacturing method of 19, wherein the seal pattern completely overlaps the second stem portion and the second branch portion of the second dam pattern in a top plan view.

* * * * *